United States Patent
Holzer et al.

(10) Patent No.: US 12,525,044 B2
(45) Date of Patent: Jan. 13, 2026

(54) AUTOMATIC PROPAGATION OF ANNOTATIONS IN IMAGES

(71) Applicant: Fyusion, Inc., San Francisco, CA (US)

(72) Inventors: Stefan Johannes Josef Holzer, San Mateo, CA (US); Tanvir Parhar, San Francisco, CA (US); Matteo Munaro, San Francisco, CA (US); Martin Saelzle, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 195 days.

(21) Appl. No.: 18/358,439

(22) Filed: Jul. 25, 2023

(65) Prior Publication Data

US 2025/0037489 A1    Jan. 30, 2025

(51) Int. Cl.
| | | |
|---|---|---|
| *G06V 20/70* | (2022.01) | |
| *G06T 3/00* | (2024.01) | |
| *G06T 7/00* | (2017.01) | |
| *G06T 7/73* | (2017.01) | |
| *G06T 17/00* | (2006.01) | |

(52) U.S. Cl.
CPC ............ *G06V 20/70* (2022.01); *G06T 3/00* (2013.01); *G06T 7/73* (2017.01); *G06T 7/97* (2017.01); *G06T 17/00* (2013.01); *G06T 2200/04* (2013.01); *G06T 2207/20021* (2013.01); *G06T 2207/20081* (2013.01); *G06T 2207/20084* (2013.01); *G06T 2207/30248* (2013.01)

(58) Field of Classification Search
CPC ....... G06T 17/00; G06T 19/006; G06T 19/20; G06T 2200/04; G06T 2207/20021; G06T 2207/20081; G06T 2207/20084; G06T 2207/30248; G06T 2219/004; G06T 2219/2012; G06T 3/00; G06T 7/73; G06T 7/97; G06V 10/82; G06V 20/647; G06V 20/70

See application file for complete search history.

(56) References Cited

U.S. PATENT DOCUMENTS

| | | | | |
|---|---|---|---|---|
| 2017/0336320 | A1* | 11/2017 | Yalin ....................... | G01N 21/39 |
| 2018/0270417 | A1* | 9/2018 | Suitoh ..................... | H04N 25/61 |

(Continued)

FOREIGN PATENT DOCUMENTS

| | | | | |
|---|---|---|---|---|
| CN | 110189397 A | * | 8/2019 | ............. G06T 17/00 |

OTHER PUBLICATIONS

J. Leon et al., "Automatic Image Annotation and Retrieval using Cross-Media Relevance Models", University of Massachusetts, Amherst, MA, SIGIR'03, Aug. 2003, 8 pages.

(Continued)

*Primary Examiner* — Ming Wu
(74) *Attorney, Agent, or Firm* — Kwan & Olynick LLP

(57) ABSTRACT

A plurality of images of an object may be processed. The plurality of images may comprise a first image having an annotation. The plurality of images may further comprise second images. The annotation may be absent from the second images. A placement of the annotation for the second images such that the annotation is configured to be included in the second images may be automatically determined. The second images may be caused to include the annotation in accordance with the determined placement. The annotated second images may be stored on a storage device.

20 Claims, 16 Drawing Sheets

(56) References Cited

U.S. PATENT DOCUMENTS

| | | | |
|---|---|---|---|
| 2022/0358775 A1* | 11/2022 | Hantehzadeh | G06T 7/11 |
| 2024/0070812 A1* | 2/2024 | Garrepalli | G06T 3/4053 |

OTHER PUBLICATIONS

Liu Wenyin et al., "Semi-Automatic Image Annotation", Microsoft, Dec. 2000, 8 pages.
Michael Rubinstein et al., "Annotation Propagation in Large Image Databases via Dense Image Correspondence", Massachusetts Institute of Technology. Computer Science and Artificial Intelligence Laboratory, Issued in 2012, 14 pages.
Suyog Dutt Jain et al., "Active Image Segmentation Propagation", University of Texas at Austin, 2016, 10 pages.

* cited by examiner

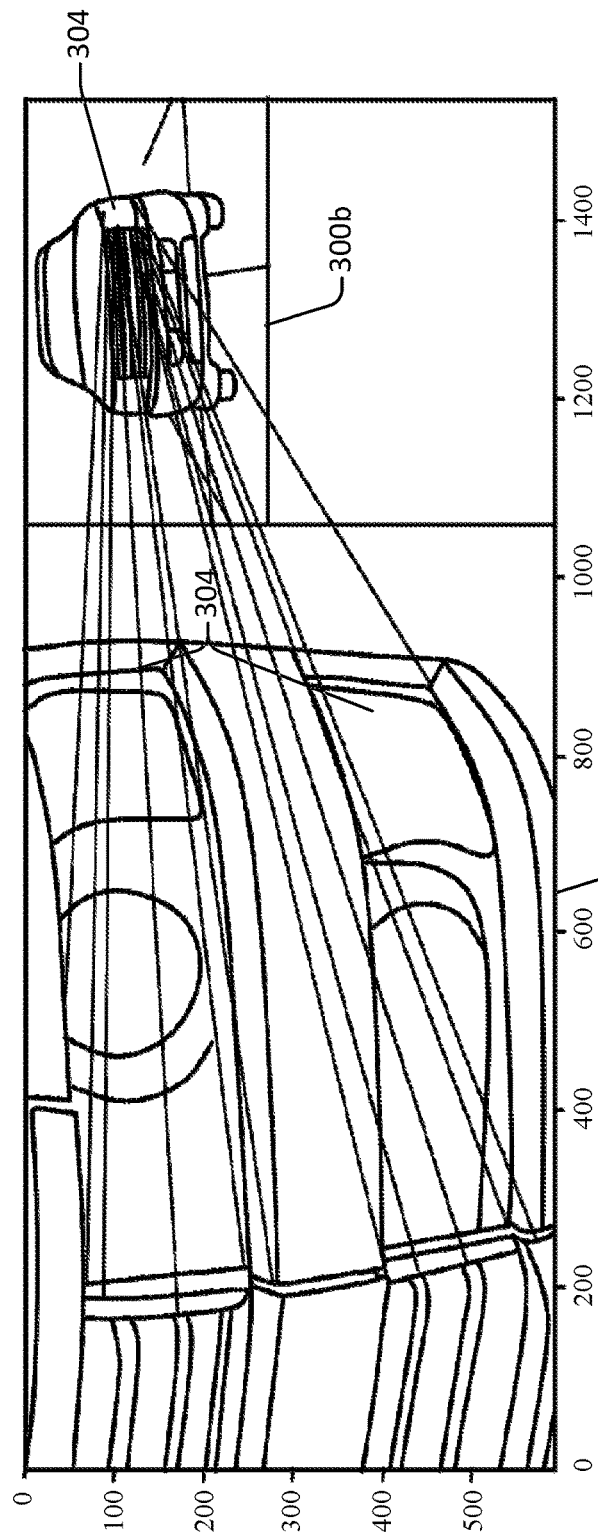
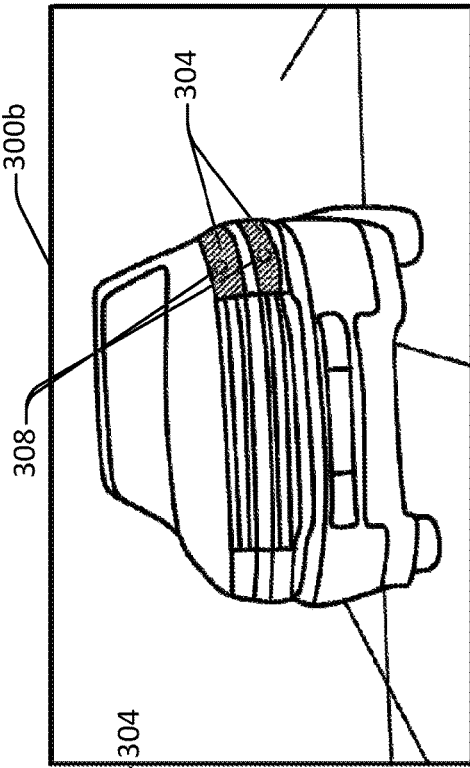
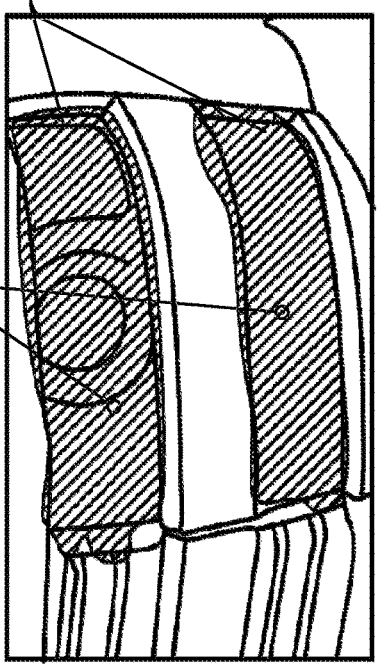
Figure 3A
Figure 3B
Figure 3C
Figure 3D

AUTOMATIC PROPAGATION OF ANNOTATIONS IN IMAGES

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to image processing, and more specifically to propagation of annotations in images.

BACKGROUND

Accurate automated damage assessment models consume a large amount of training data. Labeling such training data manually may be time-consuming and introduces a risk of human error.

BRIEF DESCRIPTION OF DRAWINGS

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

FIGS. 3A-D illustrate examples of images of portions of a car, in accordance with some implementations.

DETAILED DESCRIPTION

Figure 1:
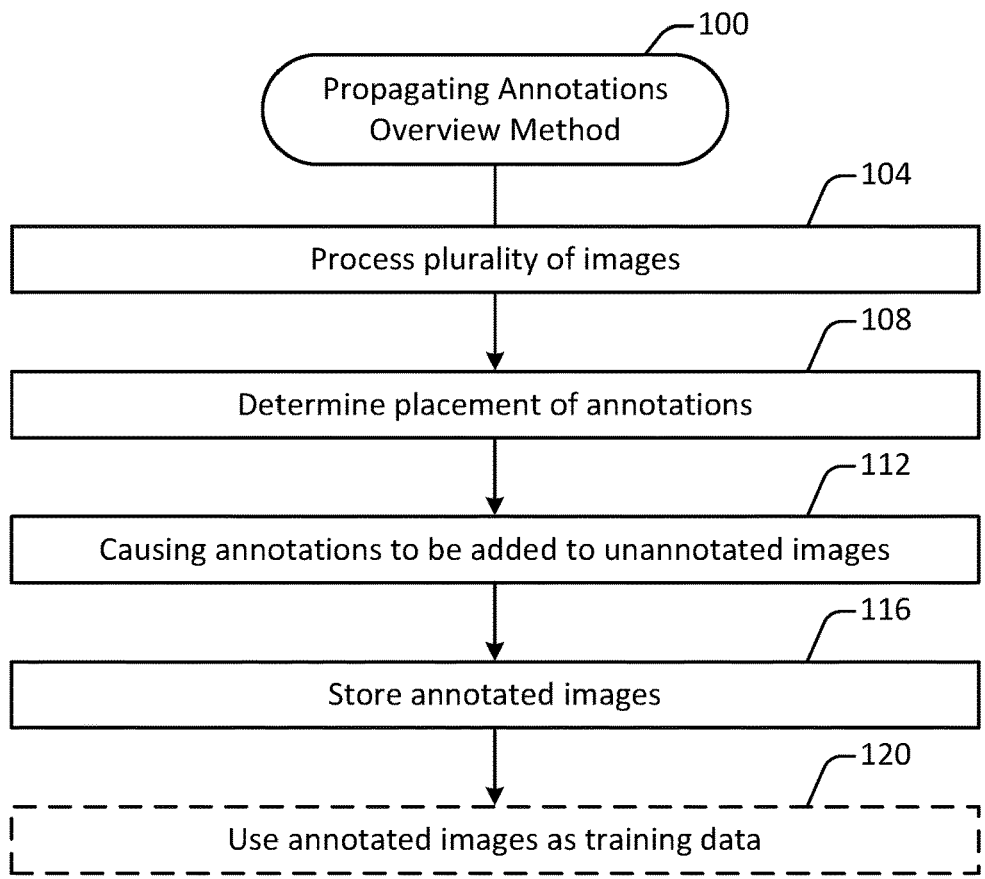
FIG. 1 illustrates a method for propagating annotations, performed in accordance with some implementations.

The various embodiments, techniques and mechanisms described herein provide for automated propagation of annotations in images of an object. Such annotations may be of type, e.g., points of interest associated with the object, bounding boxes for deep learning-based detectors, pixel masks for semantic segmentation networks, etc. While many examples discussed herein relate to images of cars associated with damage assessment models, the disclosed techniques are widely applicable to annotations in images of any type of object. Additionally, frames from multi-view captures of an object such as a car are often used as examples of images. One having skill in the art can appreciate that discussion of such frames may be interchanged with other types of images of any object of interest.

Traditionally, annotating training data may be a time-consuming process, leaving room for human error. By way of illustration, Arden Automotive employs Jacques to annotate images of damaged cars for use as training data. The training data is then consumed by models such as neural networks that automatically assess damages in images of cars. Unfortunately, Jacques does not annotate some images properly, training the model incorrectly. As a result, the model frequently assesses damages erroneously. Furthermore, employing Jacques is costly to Arden Automotive. By spending the majority of his time annotating images instead of doing other work for Arden Automotive, Jacques is unable to use his creative talents on assignments that are better suited to his creative skills.

In contrast to conventional approaches, the disclosed techniques may be used to automatically propagate annotations. Returning to the above example, Jacques carefully and correctly labels a single image of a car. Arden Automotive then applies the disclosed techniques to automatically propagate the labels to thousands of other images of the car taken from different perspectives and/or from different cameras. These thousands of images may be used as training data for the Arden Automotive Damage Assessment Model. Since the model is well-trained due to the properly annotated training data, the Arden Automotive Damage Assessment Model assesses damages with an extremely high degree of accuracy. Additionally, since Jacques only annotated a single image, he spends his remaining time coming up with new innovations for Arden Automotive.

One having skill in the art may appreciate that automated propagation of annotations may be greatly valuable for improving the accuracy of any kind of neural network. For example, mask propagation allows for automated generation of training data for solving both classification and segmentation computer vision problems. Since propagated annotations may be associated with any feature of any object of interest, these methods may be used widely for a variety of purposes. The disclosed techniques, for example, may be used for example to propagate semantic segmentation annotations of all car panels, damages, etc. to all available frames, increasing training dataset size for a multi-class segmentation neural network.

In some implementations, the disclosed techniques may be applied to propagate multiple annotations from a single image. By way of example, any of the disclosed techniques discussed below may be executed with respect to each annotation in a set of images.

Referring now to the Figures, FIG. 1 illustrates a method 100 for propagating annotations, performed in accordance with some implementations.

At 104 of FIG. 1, images are processed. By way of example, a computing system may receive a set of images of an object such as a car. The images may be captured in a variety of manners from any type of camera. The images may include any combination of multi-view or single view captures of the object. By way of example, the object may be a car and the images of the car may be captured in a manner outlined in U.S. patent application Ser. No. 17/649,793 by Holzer, et al, which is incorporated by reference herein in its entirety and for all purposes.

The images may include at least one annotated image having an annotation associated with a feature of the annotated image. By way of illustration, as discussed above, the annotation may be a pixel mask associated with a component or a car such as a front passenger-side headlight. The set of images may also include unannotated images that include the feature; however, the annotation associated with the feature may be absent from the unannotated images.

At 108 of FIG. 1, a placement for annotations may be determined. By way of illustration, returning to the above example, a placement of the annotation (e.g., the pixel mask associated with the headlight) may be automatically determined such that the annotation (e.g., pixel the mask associated with the headlight) may be included in association with the feature in the unannotated images.

Figure 2:
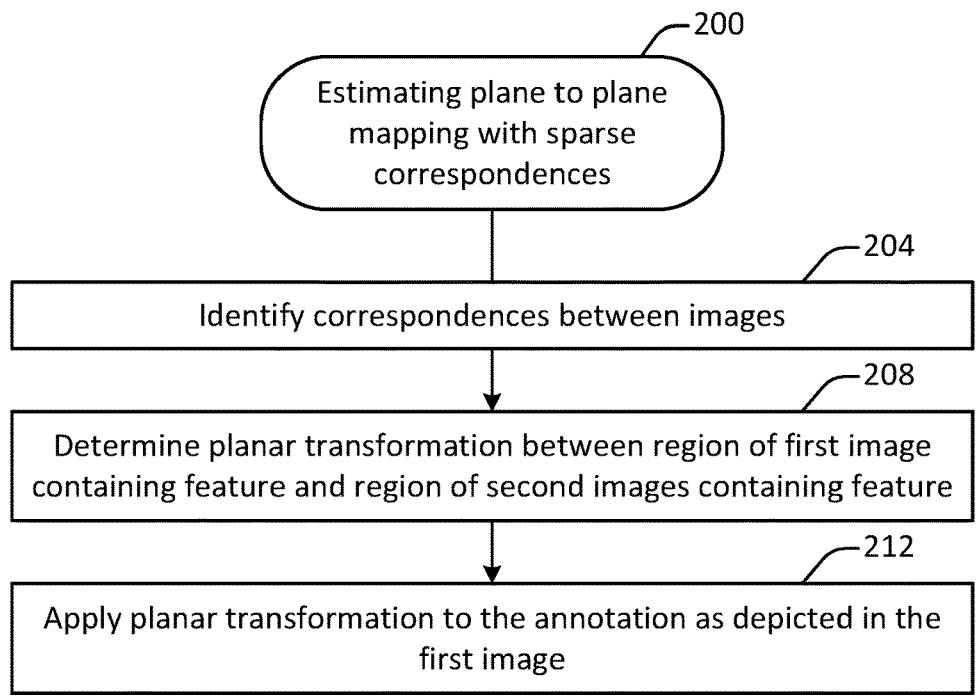
FIG. 2 illustrates a method for propagating annotations via estimating plane to plane mapping with sparse correspondences between images, performed in accordance with some implementations.

The placement of such annotations may be automatically determined in a variety of manners. For instance, FIG. 2 illustrates a method for propagating annotations via estimating plane to plane mapping with sparse correspondences between images, performed in accordance with some implementations. FIG. 2 is discussed in the context of FIGS. 3A-D, which illustrate examples of images of portions of a car, in accordance with some implementations.

At 204 of FIG. 2, correspondences are identified. For example, sparse feature matches may be estimated between individual images. By way of illustration, FIG. 3A depicts an image 300a of a portion of a car taken from a telecentric lens. FIG. 3B depicts an image 300b of the same car taken with a regular lens of an iPhone Pro® camera. Correspondences between regions of the images 300a and 300b containing the feature of interest (e.g., corners of a rectangle made by outer edges of headlights 304) may be identified by a computing system using standard techniques.

At 208 of FIG. 2, a planar transformation may be determined. By way of example, given correspondences between the images 300a and 300b (e.g., the corners of a rectangle made by outer edges of the headlights 304), a planar transformation may be determined to map approximately planar regions (e.g., headlights 304) between the images 300a and 300b. By way of example, a 3×3 planar transformation matrix for transforming the coordinates of corners of the rectangles made by the outer edges of the headlights 304 from the image 300a to the image 300b may be estimated. An example of such a 3×3 planar transformation matrix, and its derivation, is discussed in further detail below in the context of 804 of FIG. 8.

At 212 of FIG. 2, the planar transformation determined at 208 is applied to the annotation as depicted in the annotated image. By way of illustration, FIG. 3C depicts a mask 308 (e.g., an example of an annotation) overlaid on the image 300a. The 3×3 planar transformation matrix determined at 208 of FIG. 2 may be applied to the mask 308 of FIG. 3C to determine a placement for the mask 308 such that the mask 308 may be overlaid on the headlights 304 in the image 300b as depicted in FIG. 3D.

Figure 4:
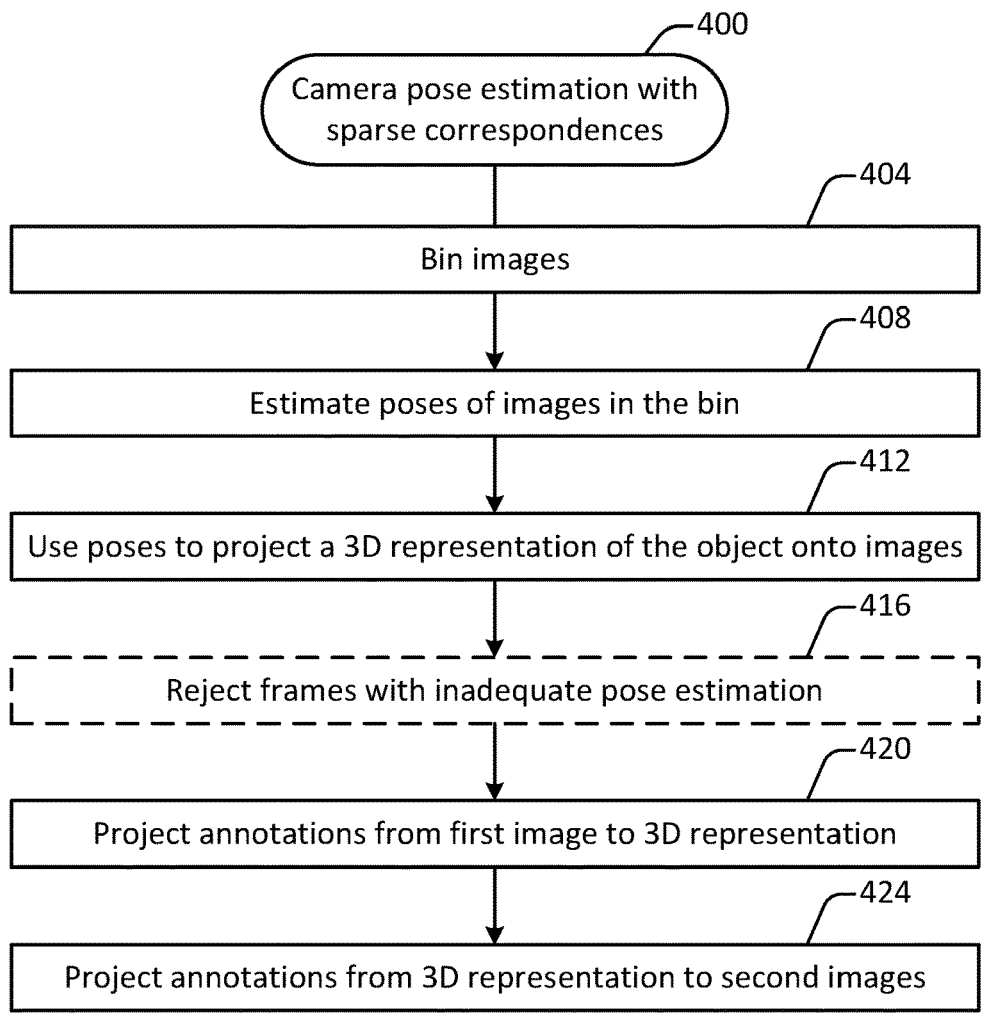
FIG. 4 illustrates a method for propagating annotations via camera pose estimation with sparse correspondences, performed in accordance with some implementations.
Figure 5:
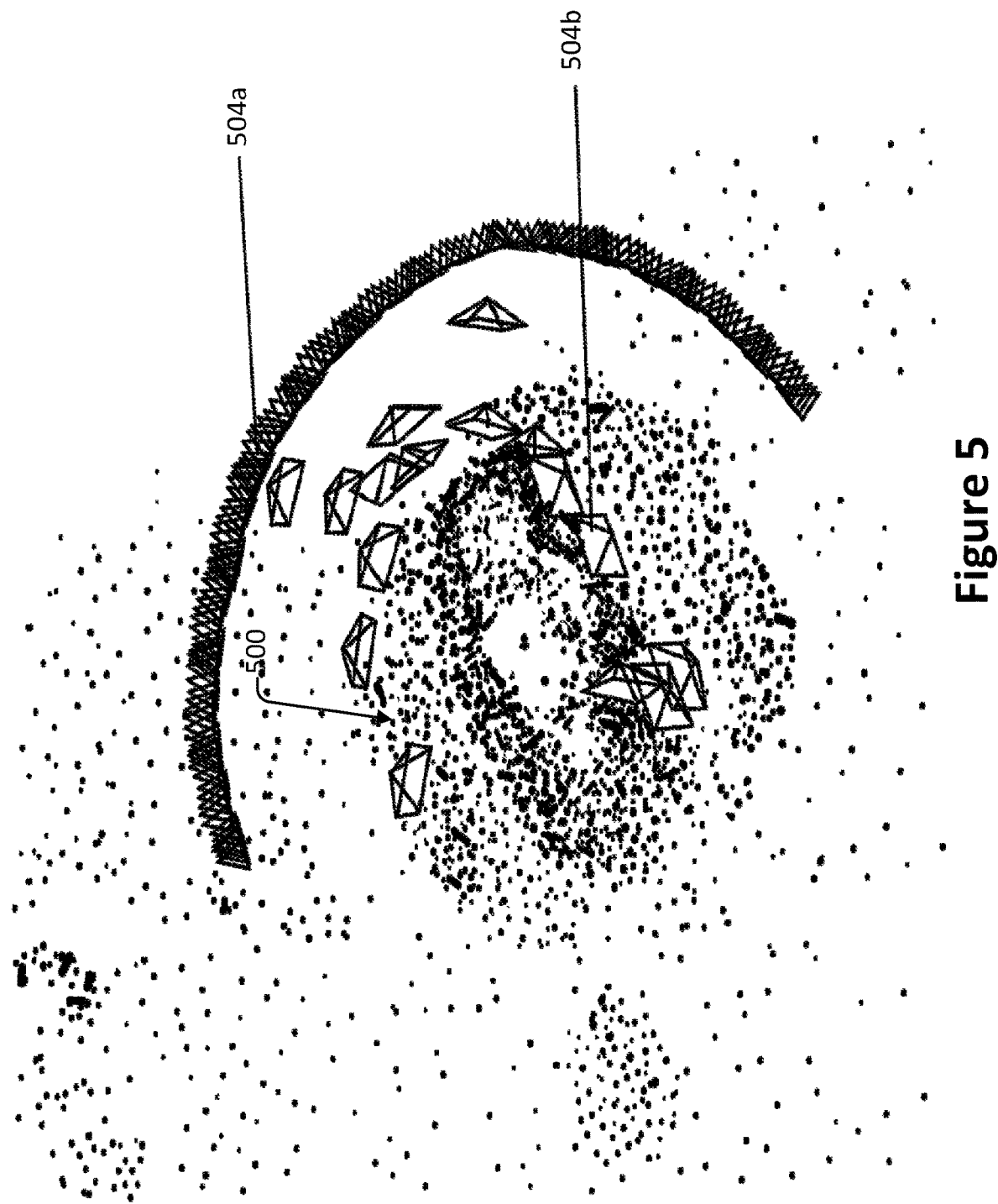
FIG. 5 illustrates an example of sets of images, in accordance with some implementations.
Figure 6C:
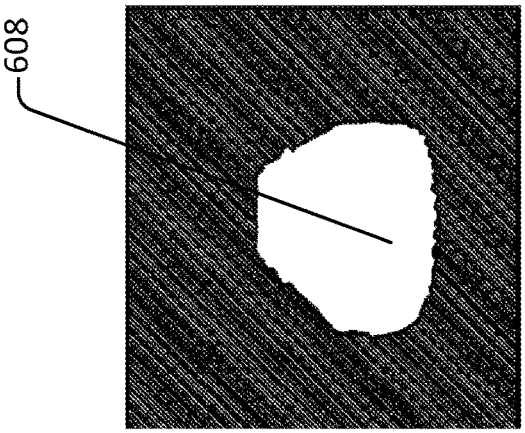
FIG. 6C illustrates an example of a convex hull of a projected three-dimensional representation of a car in a two-dimensional image plane, in accordance with some implementations.
Figure 6B:
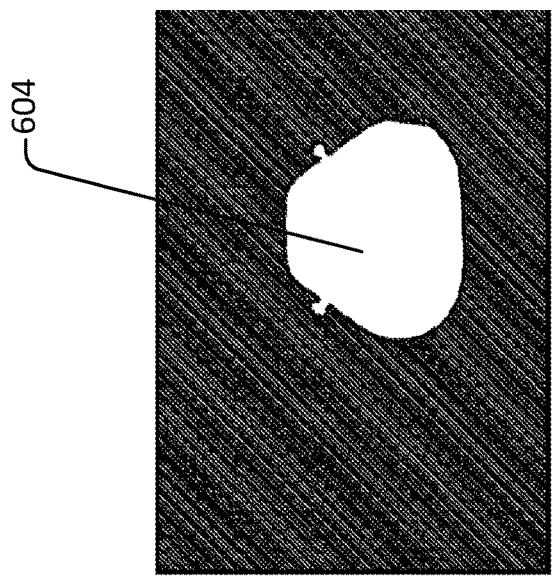
FIG. 6B illustrates an example of a binary mask from a semantic segmentation network, in accordance with some implementations.
Figure 6A:
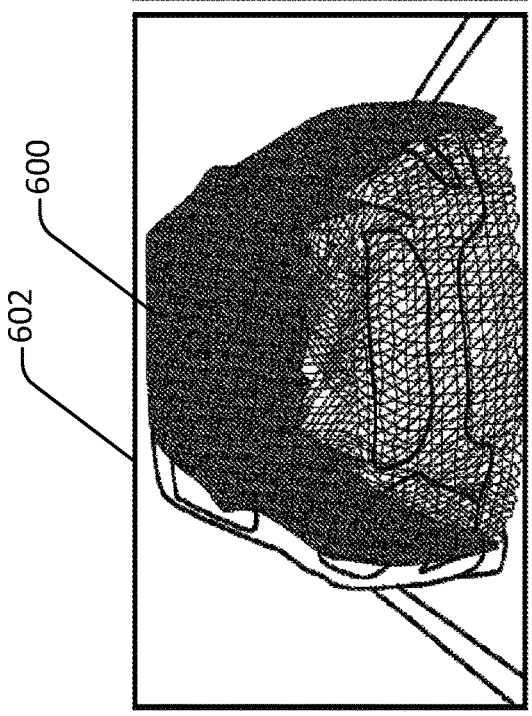
FIG. 6A illustrates an example of a three-dimensional representation of a car projected onto an image of the car, in accordance with some implementations.
Figure 7B:
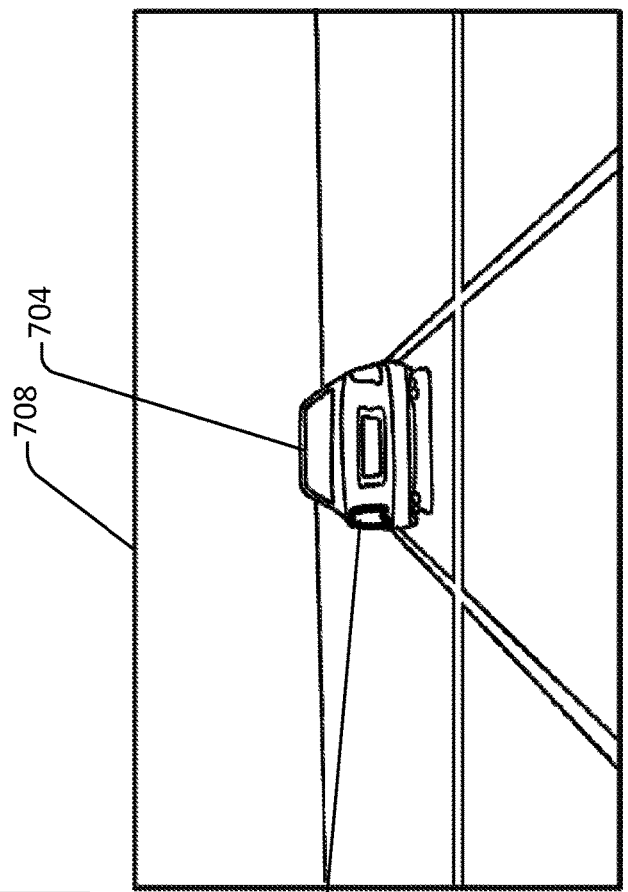
FIG. 7B illustrates an example of an image of a portion of a car containing a propagated mask, in accordance with some implementations.
Figure 7A:
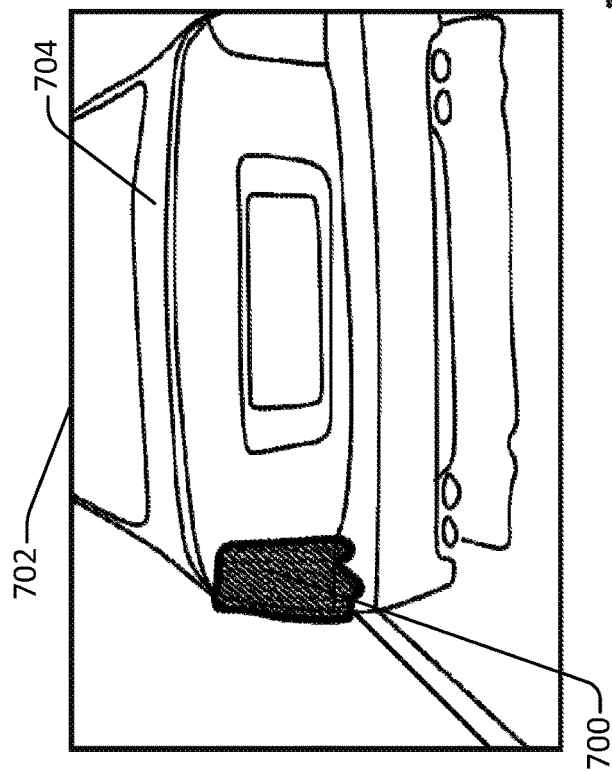
FIG. 7A illustrates an example of an image of a portion of a car containing an annotation, in accordance with some implementations.

Also, or alternatively, referring back to 108 of FIG. 1, the placement for annotations may be determined in the manner shown in FIG. 4. FIG. 4 illustrates a method 400 for propagating annotations via camera pose estimation with sparse correspondences, performed in accordance with some implementations. FIG. 4 is discussed in the context of FIGS. 5-7B. FIG. 5 illustrates an example of sets of images, in accordance with some implementations. FIG. 6A illustrates an example of a three-dimensional representation 600 of a car projected onto an image 602 of the car, in accordance with some implementations. FIG. 6B illustrates an example of a binary mask from a semantic segmentation network, in accordance with some implementations. FIG. 6C illustrates an example of a convex hull of a projected three-dimensional representation of a car in a two-dimensional image plane, in accordance with some implementations. FIG. 7A illustrates an example of an image of a portion of a car containing an annotation, in accordance with some implementations. FIG. 7B illustrates an example of an image of a portion of a car containing a propagated mask, in accordance with some implementations.

At 404 of FIG. 4, images are binned. By way of illustration, the images may be frames of a multi-view capture of an object such as a car. Such frames may be binned such that consecutive frames are placed in bins together. For instance, such binning may occur such that images that depict an object in the same or similar pose may be placed in bins together.

At 408 of FIG. 4, poses of images each bin may be estimated. By way of example, a feature-based pose estimation algorithm may be used to estimate the pose of the object depicted in the images in each given bin. Further explanation of various techniques by which poses may be estimated are discussed in greater detail in U.S. patent application Ser. No. 16/518,570 by Holzer et al incorporated by reference herein in its entirety and for all purposes.

At 412 of FIG. 4, the poses estimated at 408 are used to project a three-dimensional representation (e.g., mesh 600 of FIG. 6A) of the object (e.g., the car 500 of FIG. 5) onto the images (e.g., the images 504a and 504b of the car 500).

By way of illustration, once the pose of the car 500 in each of the images is known, these poses may be used to project three-dimensional representation 600 of the car 500 onto the images 504a and 504b.

In some implementations, at 416 of FIG. 4, images having inadequate pose estimation may be rejected. By way of example, quality assessment of the poses estimated at 412 may be performed. If the projected three-dimensional representation overlays the object properly the estimated pose may be considered adequate. To test this, a semantic segmentation deep neural network may be used. Such a neural network may segment the object of interest (e.g., the car 500) for generating a binary mask (e.g., the binary mask 604 of FIG. 6B containing the pixels of the object (e.g., the car 500).

In some implementations, the overlap of a convex hull 608 of the projected three-dimensional representation 600 with the binary mask 604 may be used as a criterion for pose quality assessment. If the overlap is below a particular threshold (e.g., 99%, 95%, 90%, etc.), the image could be rejected, as the underlying estimated pose may be inadequate.

At 420 of FIG. 4, the annotations are projected from the annotated image to the three-dimensional representation. By way of example, after rejecting frames with inadequate pose estimation, the estimated pose and intrinsic camera parameters may be used to project the masks from the annotated images to the three-dimensional representation of the object and then from the three-dimensional representation to any of the other images whose extrinsic and intrinsic parameters are either available or estimated. By way of example, annotation 700 of FIG. 7A may be projected from image 702 onto a three-dimensional representation of car 704.

A wide range of types of types of three-dimensional representations of objects may be used in conjunction with the disclosed techniques. For instance, some examples of types of three-dimensional representations include point-clouds, dense and sparse meshes, three-dimensional skeleton key points of the object of interest, etc. As a further generalization, the disclosed techniques may be implemented without an explicit three-dimensional representation of the object, instead exploiting pixel-level correspondences. Such correspondences may be inferred by a neural network that learns a semantic mapping from a perspective image to a consistent space, such that there is a one-to-one mapping from images to the space (see e.g., U.S. patent application Ser. No. 16/518,501 by Holzer et al, which is incorporated herein in its entirety and for all purposes.)

At 420 of FIG. 4, the annotations are projected from the three-dimensional representation to the unannotated images. By way of example, the annotation 700 of FIG. 7A may be projected from the three-dimensional representation of the car 704 to image 708 of FIG. 7B such that the image 708 includes the annotation 700.

In some implementations, when image poses are known or otherwise available, the method 400 may extend to estimating single-view or multi-view depth in lieu of using a mesh or other types of three-dimensional representations.

By way of illustration, the image-to-depth mapping for each pixel in each frame of a multi-view capture of an object may be known. In this case, the known image-to-depth mapping may be used to estimate a dense mapping between pixels across frames, given the intrinsic and extrinsic information associated with each frame. This depth mapping may come from a variety of sources (e.g., active sensors such as Kinect or passive sensors like stereo rigs, etc.) Also or alternatively, data driven techniques such as a Neural Network architecture may be used to estimate a depth mapping from a monocular image. Given the depth-map, each pixel of interest from a source frame may be projected into a three-dimensional space to a point location. The point location may then be projected to a target frame. Thereby, yielding a frame-to-frame mapping useable to propagate any annotations of interest amongst the frames of the multi-view capture of the object.

Figure 8:
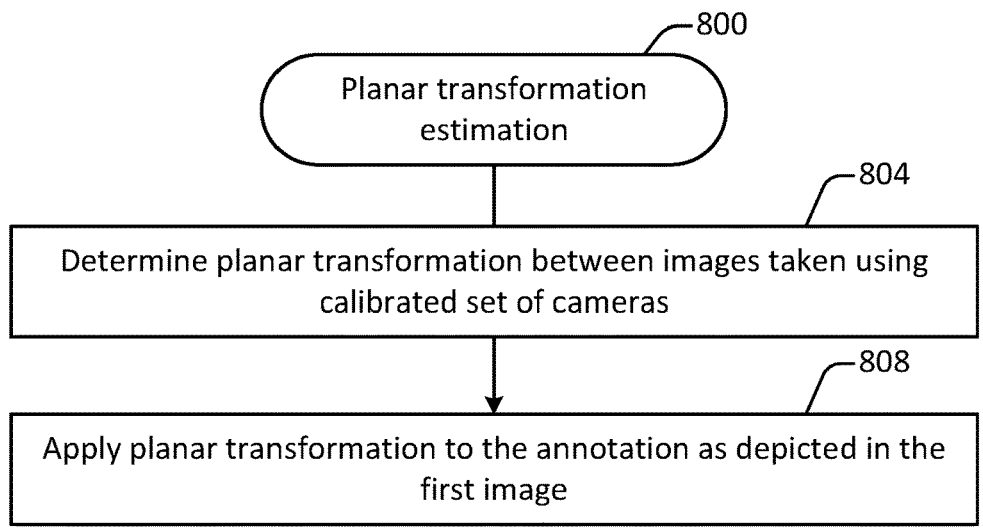
FIG. 8 illustrates a method for propagating annotations via planar transformation estimation, performed in accordance with some implementations.
Figure 9:
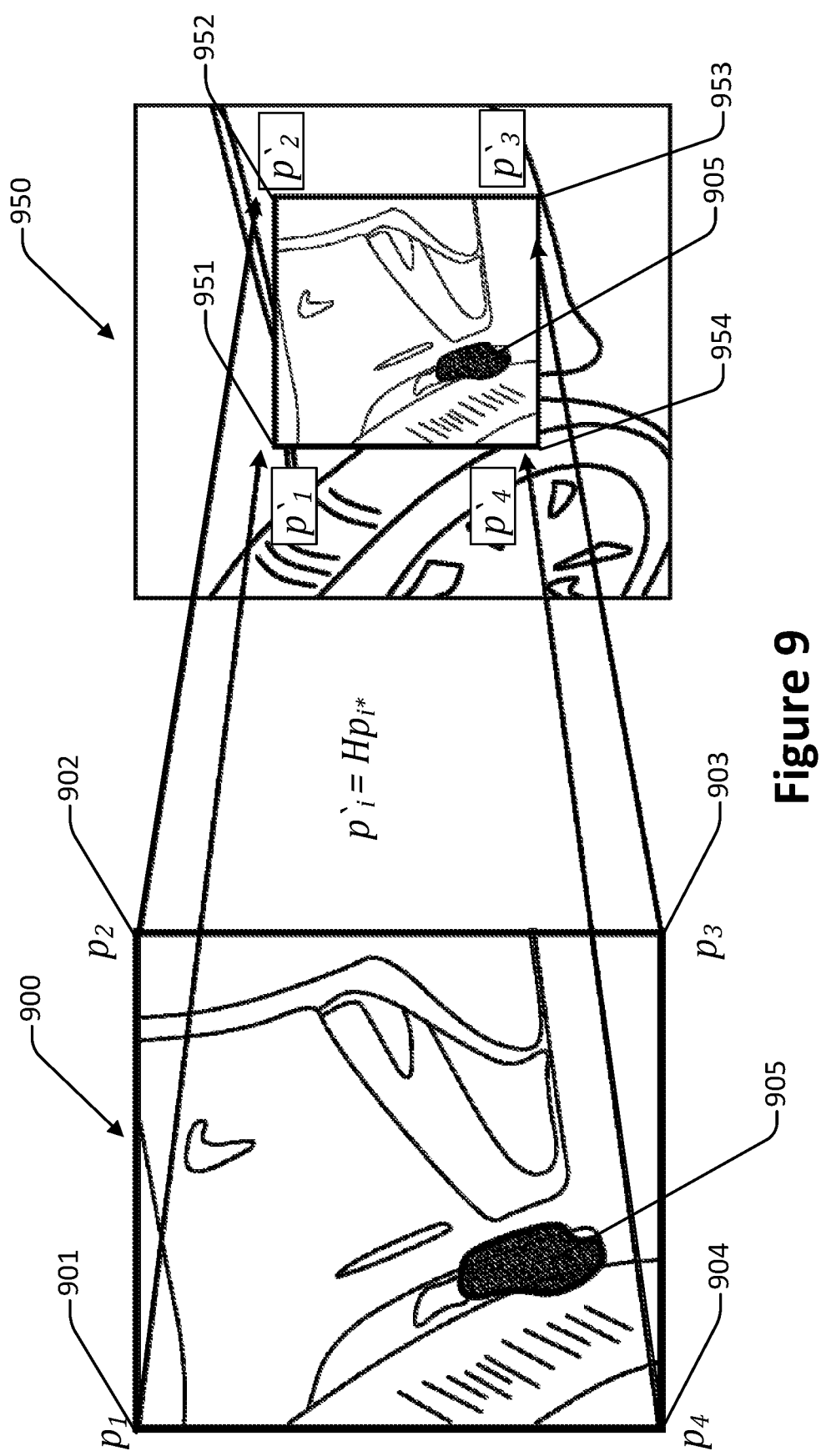
FIG. 9 illustrates an example of a mapping of an annotation from a first image to a second image, in accordance with some implementations.
Figure 10A:
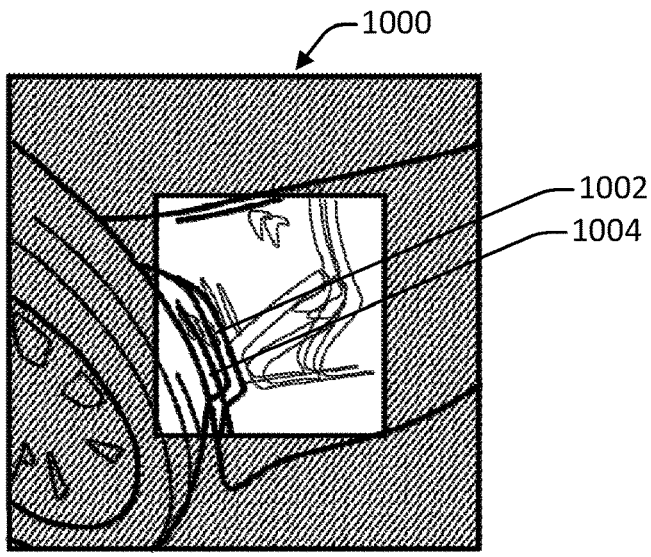
FIG. 10A illustrates an example of images aligned after homography estimation, in accordance with some implementations.
Figure 10B:
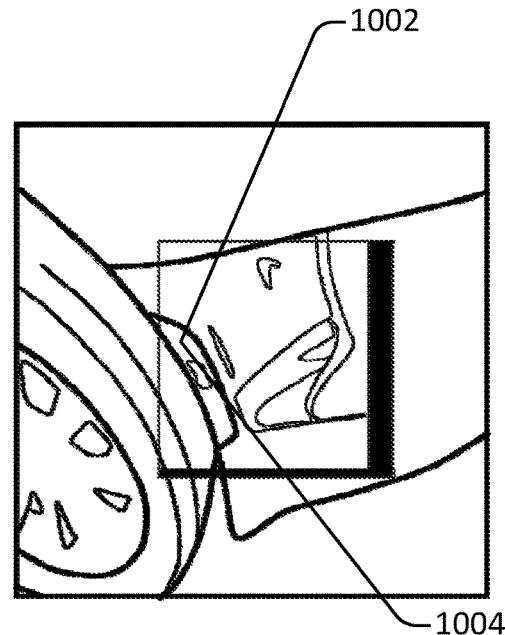
FIG. 10B illustrates an example of images aligned after refinement, in accordance with some implementations.
Figure 10C:
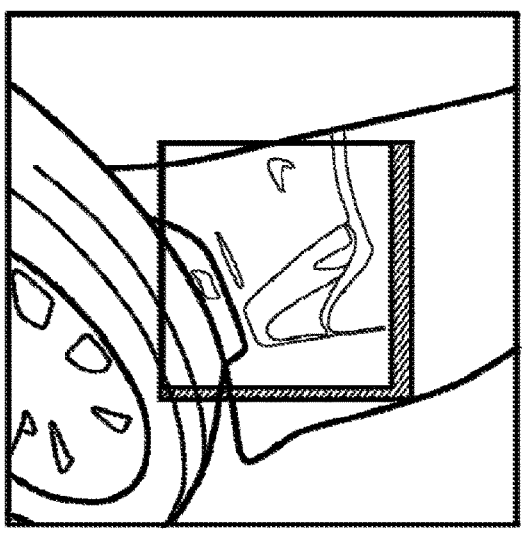
FIG. 10C illustrates an example of a mask from a close-up image mapped to a wider view image, in accordance with some implementations.

Also or alternatively, referring back to 108 of FIG. 1, the placement for annotations may be determined in the manner shown in FIG. 8. FIG. 8 illustrates a method 800 for propagating annotations via planar transformation estimation, performed in accordance with some implementations. FIG. 8 is discussed in the context of FIGS. 9-10C. FIG. 9 illustrates an example of a mapping of an annotation from a first image to a second image, in accordance with some implementations. FIG. 10A illustrates an example of images aligned after homography estimation, in accordance with some implementations. FIG. 10B illustrates an example of images aligned after refinement, in accordance with some implementations. FIG. 10C illustrates an example of a mask from a close-up image mapped to a wider view image, in accordance with some implementations.

The method 800 of FIG. 8 may occur in a similar manner as the method 200 of FIG. 2. However, the method 800 may be performed based on images captured by a calibrated set of cameras with known intrinsic and extrinsic parameters. Therefore, a planar homographic transformation between different images of the object may be estimated without identification of corresponding points between the different images.

At 804 of FIG. 8, a planar transformation between calibrated images may be determined. The calibrated images may have been taken using a calibrated set of cameras. By way of illustration, $c_1$ and $c_2$ are two cameras with distinct viewpoints. $c_1$ is situated at the origin of a reference frame. $k_1$ and $k_2$ are each camera's respective intrinsic parameters. R is the rotation of the location of $c_2$ with respect to the location of $c_1$ and $\vec{t}$ is the displacement between the locations of $c_1$ and $c_2$. $\hat{n}$ is a unit vector normal to the plane P through which images taken from $c_1$ to images taken from $c_2$ are mapped. By way of example, assuming P is defined by the x-axis and y-axis of a Cartesian coordinate system, $\hat{n}$ would be $\hat{k}$ or (0,0,1). The distance between plane P and the origin is d. A a 3×3 planar transformation matrix that maps points from images taken from 1 to images taken from $c_2$ through the plane P is defined by homography ($H_{12}$):

$$H_{12} = R - \vec{t}\left(\frac{\hat{n}^T}{d}\right)$$

By way of example, FIG. 9 depicts two images $i_1$ 900 captured by $c_1$ and $i_2$ 950 captured by $c_2$, of the same scene. The image $i_1$ 900 contains manually annotated mask 905. The homography between the two images $i_1$ 900 and $i_2$ 950 is defined by $H_{12}$ above. Once $H_{12}$ is estimated, pixels may be mapped from the image $i_1$ 900 to the image $i_2$ 950. By way of example, pixels of the mask 905 may be mapped from the image $i_1$ 900 to the image $i_2$ 950.

Any annotation of any part of interest from an image of the object taken with a particular camera may be mapped to any other image of the object taken by another camera that is calibrated with the particular camera. For instance, $p_1$ 901, $p_2$ 902, $p_3$ 903, and $p_4$ 904 are the coordinates of the four corners of the image $i_1$ 900. The corresponding coordinates $p'_1$ 951, $p'_2$ 952, $p'_3$ 953, and $p'_4$ 954 are the coordinates of the four corners of the image $i_2$ 950.

In some implementations, errors in homography-based mapping may be corrected via refinement. By way of illustration, homography-based mapping assumes that the points in both the image $i_1$ 900 and the $i_2$ 950 lie on the same plane. Such an assumption may not always hold, introducing error into the homography-based mapping. As visible in image 1000 of FIG. 10A, mask 1002 of part of interest 1004 is not mapped exactly where the part of interest 1004 is depicted in the image 1000. Therefore, further refinement of the estimated homography may be done. To estimate a refinement transformation, a technique such as Enhanced Correlation Coefficient (ECC) Maximization may be used. This technique calculates the alignment that maximizes the similarity between the images $i_1$ 900 and $i_2$ 950 of FIG. 9. This optimization may be done over transformation parameters such that the similarity between the image images $i_1$ 900 and the corresponding part of the image $i_2$ 950 containing the feature of interest maximized. This process may be performed iteratively beginning after the occurrence of the homography estimation discussed above.

One having skill in the art may appreciate that such a refinement transformation allows for more accurate and quicker convergence. For example, in FIG. 10B, unlike in FIG. 10A, the alignment process described in the above paragraph has been applied and the mask 1002 and the feature of interest 1004 are in closer alignment.

In some implementations, the disclosed techniques may be used to generate additional synthetic training data by automatically propagating annotations from close-up images to wide-view images. By way of example, FIG. 10C shows the mask 1002 annotated on a close-up picture overlaid onto a wider image of the object based on the estimated refinement transformation discussed above. This mask 1002 may now be used together with the wider-view image as additional training data for training a neural network.

At 808 of FIG. 8. The planar transformation may be applied to the annotation as depicted in the first image. By way of illustration, $H_{12}$ may be applied to mask 905 in the image $i_1$ 900 of FIG. 9 such that the mask 905 may be depicted in association with the feature of interest in the image $i_2$ 950. As discussed above, additional refinement transformation may be applied to allow for closer alignment of the mask 905 with the feature of interest in the image $i_2$ 950.

In some implementations, the method 800 of FIG. 8 may be extended to estimating non-planar transformations. By way of illustration, surface information of the object of interest and the pose of one of the cameras with respect to the object of interest may be known. In this scenario a dense correspondence-based loss function may be optimized for estimating parameters for any nonplanar three-dimensional transformation. Thus, the same approach may also be used for non-planar and deformable surfaces.

Also, or alternatively, the method 800 may be expanded to estimate parameters for deformable models. By way of example, the method 800 may be extended to estimate a per-pixel dense correspondence between a source frame and a target frame in a multi-view capture of an object. For example, a frame-to-frame non-linear deformable transformation may be estimated. The pixel difference between the two frames may be treated as a loss function to optimize a parametric function mapping pixels from the source frame to the target frame. This mapping function may be modeled as a physical system such as fluid flow model, a linear or non-linear combination of basis functions such as sinusoids and cosines, polynomials, a Gaussian mixture model, through a Neural Network, etc. Iterative non-linear optimization may then be applied to tune the parameters (e.g., coefficients of basis functions) of the chosen model such that the chosen loss function is minimized. Thus, the model may be configured to map pixels from the source frame to the target frame.

In some implementations, the method 800 may be extended to estimate a mapping via dense optical flow. By way of example, there may be low displacement between an annotated image and an unannotated image. In this case, a coarse alignment may be achieved by estimating the optical flow between the two images. A per-pixel dense optical flow may provide a pixel mapping between the annotated and unannotated images. This pixel mapping could be used to propagate any regions of interest (e.g., annotations) from the annotated image to the unannotated image. On the other hand, if the annotated image and the unannotated images are not close in pixel space, an initial planar transformation may be obtained using a homography matrix using the techniques described above. The homography matrix may be estimated through points lying on a plane viewed by both the annotated image and the unannotated image. The dense optical flow may then be applied to obtain a finer dense mapping.

Figure 11:
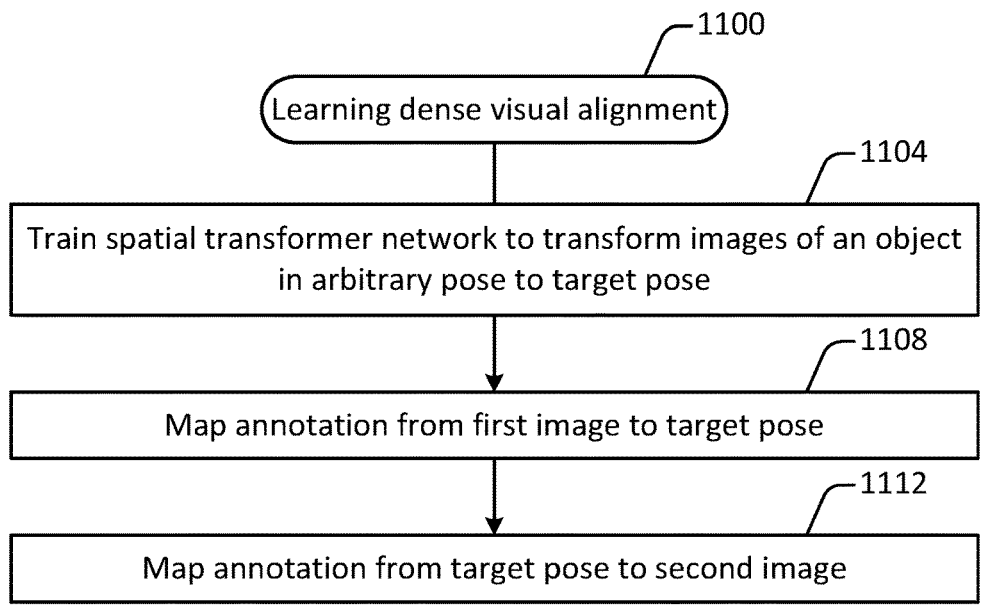
FIG. 11 illustrates a method for propagating annotations via learning dense visual alignment, performed in accordance with some implementations.
Figure 12:
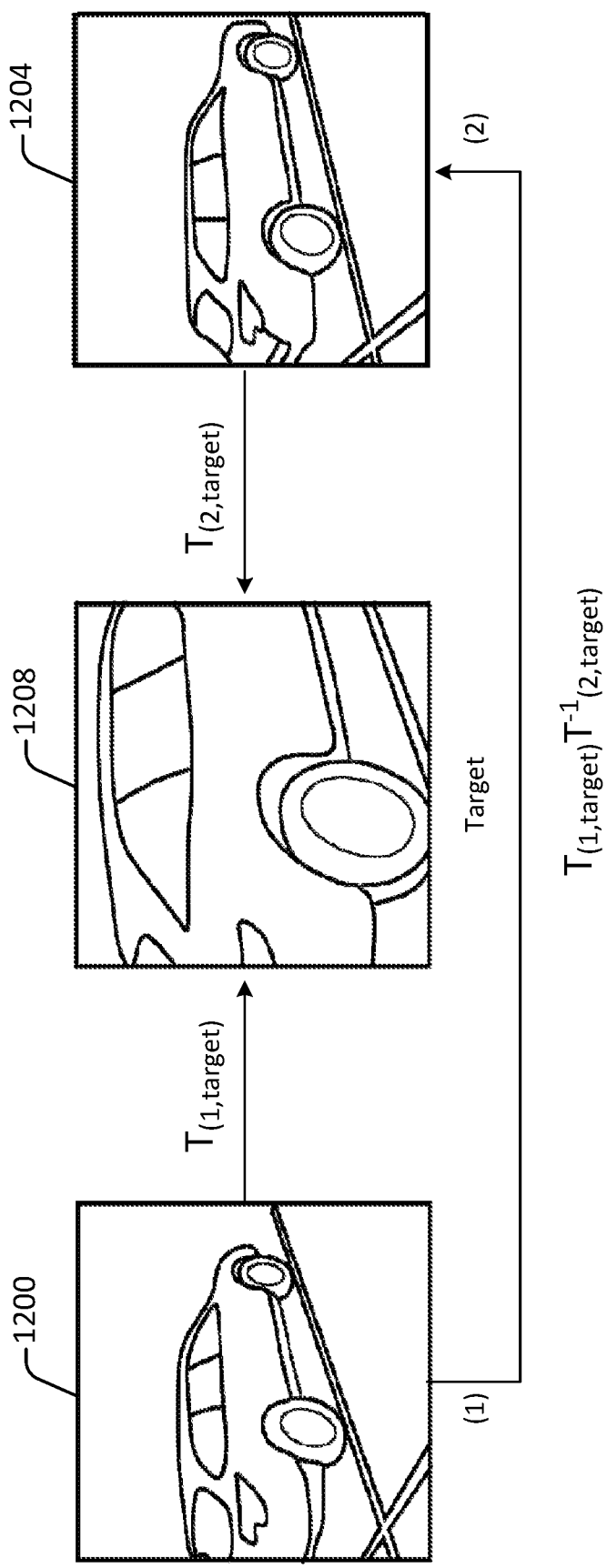
FIG. 12 illustrates examples of images of a car in different poses, in accordance with some implementations.
Figure 13:
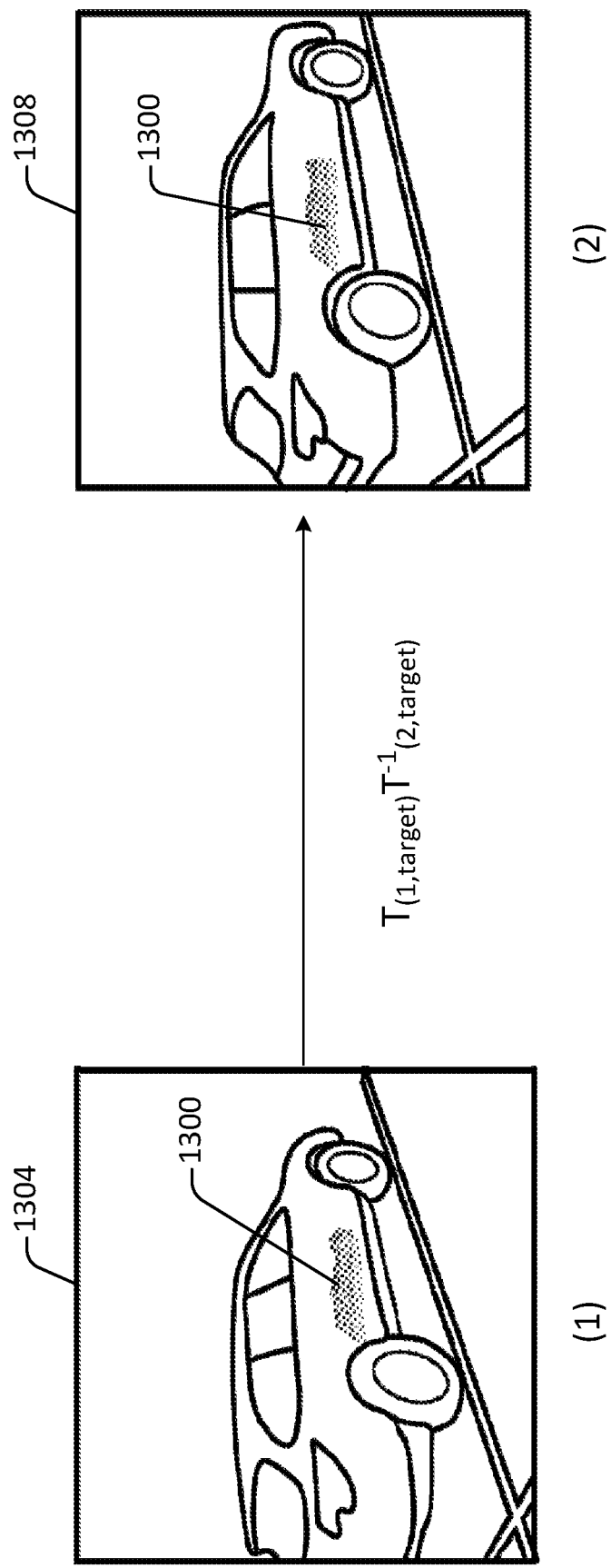
FIG. 13 illustrates an example of propagation of pixels from an image of a car to another image of the car, in accordance with some implementations.

Also or alternatively, referring back to 108 of FIG. 1, the placement for annotations may be determined in the manner shown in FIG. 11. FIG. 11 illustrates a method 1100 for propagating annotations via learning dense visual alignment, performed in accordance with some implementations. FIG. 11 is discussed in conjunction with FIGS. 12 and 13. FIG. 12 illustrates examples of images of a car in different poses, in accordance with some implementations. FIG. 13 illustrates an example of propagation of pixels from an image of a car to another image of the car, in accordance with some implementations.

At 1104 of FIG. 11, a spatial transformer network is trained to transform images of the object in an arbitrary pose to a target pose. The network may learn to transform the images of an object, such as a car, in arbitrary pose into an image of the object in a designated pose (referred to herein as the target pose.) This transformation may be learned through a strictly supervised training regime, where the objective is to learn a many to one transformation from arbitrary pose to a designated target pose. By way of illustration, as shown in FIG. 12, a spatial transformer network may be trained to transform images 1200 depicting a car in a first pose and 1204 depicting the car in a second pose into image 1208 depicting the car in the target pose.

At 1108 of FIG. 11, the annotation is mapped from the first image to a further image depicting the object in the target pose. By way of illustration, annotation 1300 on image 1304 of a car depicted in FIG. 13 may be mapped to the image 1208 of FIG. 12, depicting the car in the target pose.

At 1112 of FIG. 11, the annotation is mapped from the further image depicting the object in the target pose to unannotated image(s). By way of illustration, the annotation 1300 may be mapped from the image 1208 of FIG. 12, depicting the car in the target pose to the image 1308 of the car depicted in FIG. 13 as well as any other unannotated images of the car.

The method 1100 is described in the context of a supervised learning dataset of images of an object in arbitrary poses as input. Making such a dataset for a wide variety of objects (e.g., cars) may be challenging. One having skill in the art may appreciate that instead of relying solely on curated input and target pairs, any generative model (e.g., a generative adversarial network or a diffusion model) may be used. In some implementations, the target pose need not be fixed. Rather, the target pose may be a parameter of a generative model, and may be optimized for learning a target mode that may cover a wide variety of image poses.

Figure 14:
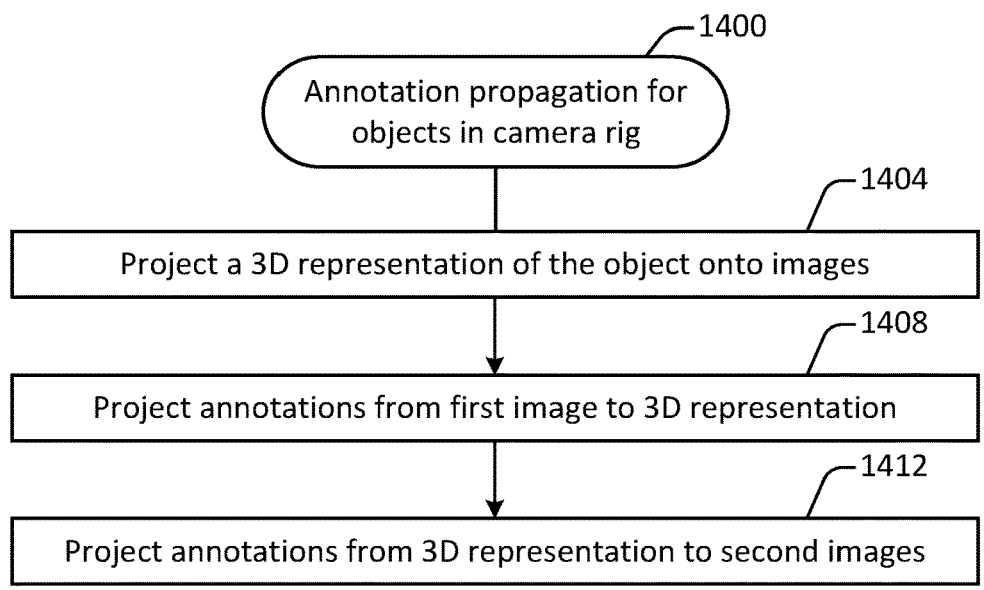
FIG. 14 illustrates a method for propagating annotations in images of objects captured in a camera rig, performed in accordance with some implementations.

Referring back to 108 of FIG. 1, the placement for annotations may also or alternatively be determined in the manner shown in FIG. 14. FIG. 14 illustrates a method for propagating annotations in images of objects captured in a camera rig, performed in accordance with some implementations. The method 1400 of may occur in a similar manner as the method 400 of FIG. 4. However, since a rig of cameras with known orientations are used for the method 1400 of FIG. 4, pose estimated of the object need not be estimated in the method 1400.

Figure 15C:
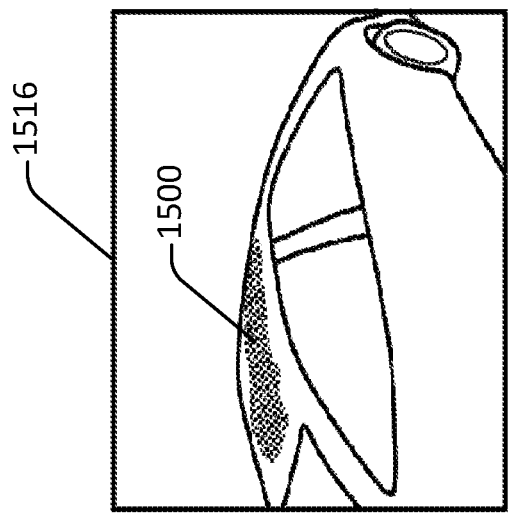
FIG. 15C illustrates an example of a mask propagated onto an image of a car taken with a camera having designated camera parameters, in accordance with some implementations.
Figure 15B:
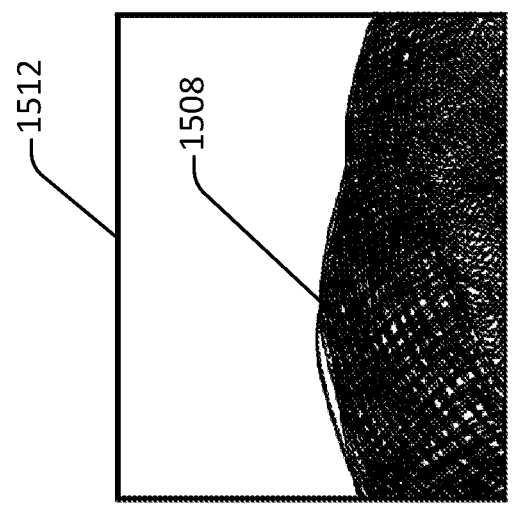
FIG. 15B illustrates an example of a three-dimensional representation of a car overlaid on an image of a car, in accordance with some implementations.
Figure 15A:
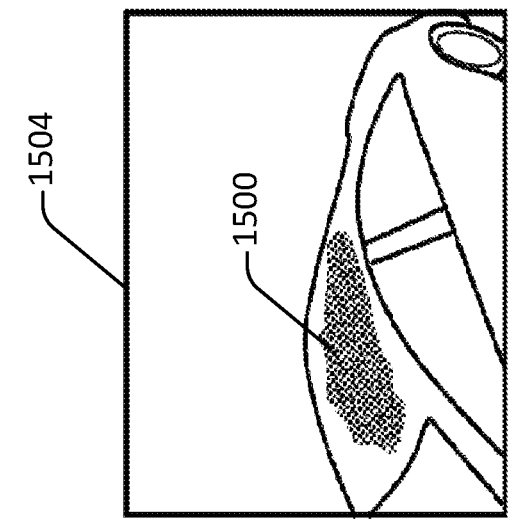
FIG. 15A illustrates an example of a mask manually overlaid on an image of a car, in accordance with some implementations.

FIG. 14 is described in conjunction with FIGS. 15A-C. FIG. 15A illustrates an example of a mask 1500 manually overlaid on an image 1504 of a car, in accordance with some implementations. FIG. 15B illustrates an example of a three-dimensional representation 1508 overlaid on an image 1512 of the car, in accordance with some implementations. FIG. 15C illustrates an example of the mask 1500 propagated onto an image 1516 of the car taken with a camera having designated camera parameters, in accordance with some implementations.

The method 1400 of FIG. 14 may be applied via projection of pixels from one calibrated image to another and/or may be extended to a fixed structure of cameras, where cameras are fixed and calibrated at distinct locations for full visibility of the object of interest. As discussed above the need for pose estimation of cameras is obviated in this scenario, as the structure of cameras is already calibrated.

In some implementations, if an object of interest is not static, a stream of frames may be used. Frames captured at varying times may then be associated to each other by estimating the motion of the object of interest. As such, the disclosed techniques may be used not only to automatically propagate annotations to images with different spatial views of an object but also to automatically propagate annotations to images of the objects captured at different times as the object moves through space.

At 1404 of FIG. 14, a three-dimensional representation of the object may be generated. By way of illustration, the three-dimensional representation 1508 of FIG. 15B may be projected onto the images 1504, 1512, and 1516 of the car depicted in FIGS. 15A-C.

At 1408 of FIG. 14, the annotation is projected from the first (manually annotated) image to the three-dimensional representation. By way of illustration, the mask 1500 of FIG. 15A may be projected onto the three-dimensional representation 1508 of FIG. 15B.

At 1412 of FIG. 14, the annotation is projected from the three-dimensional representation to the (unannotated) second image(s). By way of illustration, the mask 1500 may be projected from the three-dimensional representation 1508 of FIG. 15B to the image 1516 of the car as depicted in FIG. 15C.

As discussed above, like the method 400 of FIG. 4, a wide range of three-dimensional representations of the object of interest may be used (e.g., a dense three-dimensional mesh representation, a skeleton mesh representation, etc.)

In some implementations, the method 1400 of FIG. 14 and the method 400 of FIG. 4 may be performed without an explicit three-dimensional representation of the object. Rather, as discussed above pixel-level correspondences may be exploited.

Referring back to FIG. 1, at 112 annotations may be added to unannotated images. By way of example, a computing system may cause the second (unannotated) image(s) to include the annotations in accordance with the annotation placement determined at 108 of FIG. 1.

At 116 of FIG. 1, the (now annotated) second image(s) may be stored. By way of illustration, a computing system may cause the images for which annotations were added at 112 of FIG. 1 to be stored on a non-transitory storage medium such as storage device 1605 of FIG. 16, discussed further below.

In some implementations, at 120 of FIG. 1, annotated images may be used as training data. By way of example, as discussed above the annotations may include labeling of semantic segmentation data objects associated with vehicle components. A computing system that is implementing a damage assessment model may access annotated images of vehicle components that were stored at 116 of FIG. 1. The computing system may cause the damage assessment model to consume the annotated images to train the damage assessment model.

Figure 16:
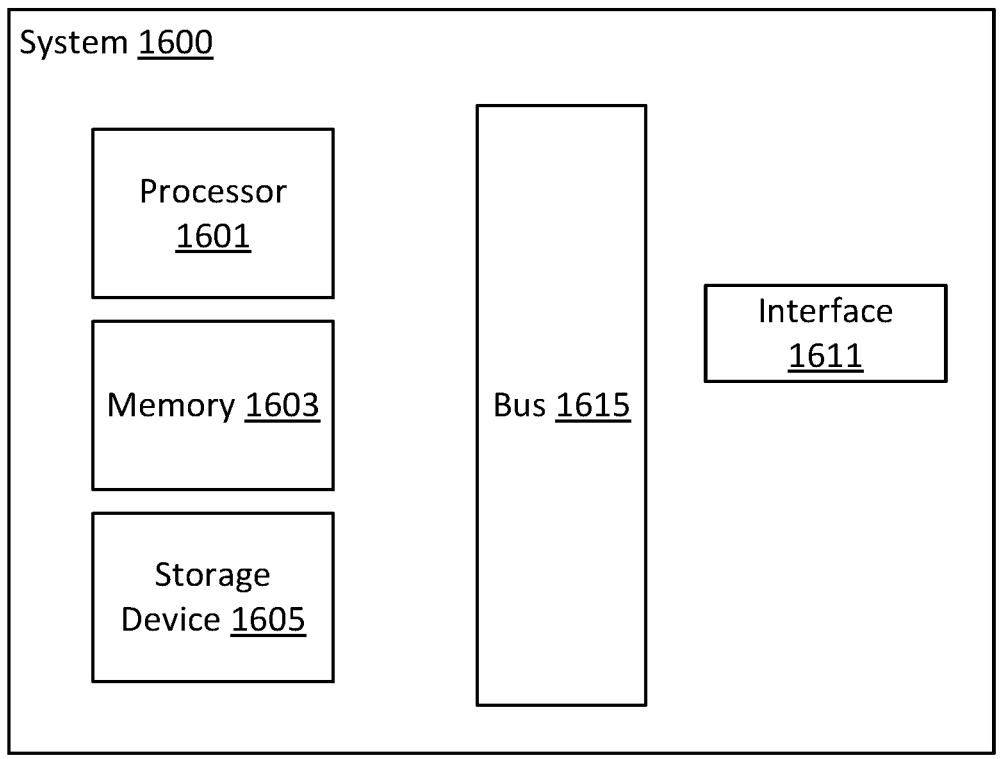
FIG. 16 illustrates one example of a computing device, in accordance with some implementations.

FIG. 16 illustrates one example of a computing device. According to various embodiments, a system 1600 suitable for implementing embodiments described herein includes a processor 1601, a memory module 1603, a storage device 1605, an interface 1611, and a bus 16116 (e.g., a PCI bus or other interconnection fabric.) System 1600 may operate as variety of devices such as artificial image generator, or any other device or service described herein. Although a particular configuration is described, a variety of alternative configurations are possible. The processor 1601 may perform operations such as those described herein. Instructions for performing such operations may be embodied in the memory 1603, on one or more non-transitory computer readable media, or on some other storage device. Various specially configured devices may also be used in place of or in addition to the processor 1601. The interface 1611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but may use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
processing a plurality of images of an object, the plurality of images comprising a first image having an annotation associated with a feature included in the first image, the plurality of images further comprising second images including the feature, the annotation associated with the feature being absent from the second images;
automatically determining, via estimation of a per-pixel dense correspondence between a source frame and a target frame using a spatial transformer network that is trained to transform images of an object in an arbitrary pose to a target pose, a placement of the annotation for the second images such that the annotation is configured to be automatically propagated to the second images to be associated with the first feature;
automatically propagating the annotation to the second images to cause the second images to include the annotation in accordance with the determined placement; and
storing, on a storage device, the annotated second images.

2. The method of claim 1, wherein determining the placement of the annotation for the second images comprises:

generating a three-dimensional representation of the object;
projecting the annotation from the first image to the three-dimensional representation; and
projecting the annotation from the three-dimensional representation to the second images.

3. The method of claim 1, wherein determining the placement of the annotation for the second images comprises:
training a spatial transformer network to transform images of the object in an arbitrary pose to a target pose;
mapping the annotation from the first image to a further image depicting the object in the target pose; and
mapping the annotation from the further image to the second images.

4. The method of claim 1, wherein determining the placement of the annotation for the second images comprises:
determining a planar transformation between calibrated images in the plurality of images, the calibrated images being taken using a calibrated set of cameras; and
applying the planar transformation to the annotation as depicted in the first image.

5. The method of claim 1, wherein determining the placement of the annotation for the second images comprises:
sorting images in the plurality of images into bins;
estimating poses of the object in the images in the bins;
using the poses to project a three-dimensional representation of the object onto the images;
projecting the annotation from the first image to the three-dimensional representation; and
projecting the annotation from the three-dimensional representation to the second images.

6. The method of claim 5, further comprising:
rejecting images having inadequate pose estimation.

7. The method of claim 1, wherein determining the placement of the annotation for the second images comprises:
identifying correspondences between the first image and the second images;
determining a planar transformation between a first region of the first image containing the feature and a second region of the second image containing the feature; and
applying the planar transformation to the annotation as depicted in the first image.

8. The method of claim 1, wherein the annotations comprise labeling of semantic segmentation data objects and the object is a car, the method further comprising:
using the annotated second images as training data for a model used to assess damages in cars.

9. The method of claim 1, wherein estimating the per-pixel dense correspondence comprises:
estimating a dense correspondence-based loss function for optimizing parameters for a three-dimensional transformation; and
applying the optimized three-dimensional transformation to the annotation as depicted in the first image to determine the placement of the annotation for the second images.

10. The method of claim 1, wherein estimating the per-pixel dense correspondence comprises:
estimating a per-pixel dense optical flow between the first image and the second images; and
applying the estimated optical flow to the annotation as depicted in the first image to determine the placement of the annotation for the second images.

11. The method of claim 1, wherein the annotation comprises a pixel-level mask defining a boundary of the feature within the first image.

12. The method of claim 11, wherein the pixel-level mask is a semantic segmentation mask associating each pixel within the boundary with a specific class label.

13. A computing system implemented using a server system, the computing system configured to cause:
processing a plurality of images of an object, the plurality of images comprising a first image having an annotation associated with a feature included in the first image, the plurality of images further comprising second images including the feature, the annotation associated with the feature being absent from the second images;
automatically determining, via estimation of a per-pixel dense correspondence between a source frame and a target frame using a spatial transformer network that is trained to transform images of an object in an arbitrary pose to a target pose, a placement of the annotation for the second images such that the annotation is configured to be automatically propagated to the second images to be associated with the first feature;
automatically propagating the annotation to the second images to cause the second images to include the annotation in accordance with the determined placement; and
storing, on a storage device, the annotated second images.

14. The computing system of claim 13, wherein determining the placement of the annotation for the second images comprises:
generating a three-dimensional representation of the object;
projecting the annotation from the first image to the three-dimensional representation; and
projecting the annotation from the three-dimensional representation to the second images.

15. The computing system of claim 13, wherein determining the placement of the annotation for the second images comprises:
training a spatial transformer network to transform images of the object in an arbitrary pose to a target pose;
mapping the annotation from the first image to a further image depicting the object in the target pose; and
mapping the annotation from the further image to the second images.

16. The computing system of claim 13, wherein determining the placement of the annotation for the second images comprises:
determining a planar transformation between calibrated images in the plurality of images, the calibrated images being taken using a calibrated set of cameras; and
applying the planar transformation to the annotation as depicted in the first image.

17. The computing system of claim 13, wherein determining the placement of the annotation for the second images comprises:
sorting images in the plurality of images into bins;
estimating poses of the object in the images in the bins;
using the poses to project a three-dimensional representation of the object onto the images;
projecting the annotation from the first image to the three-dimensional representation; and
projecting the annotation from the three-dimensional representation to the second images.

18. The computing system of claim 17, the computing system further configured to cause:
rejecting images having inadequate pose estimation.

19. The computing system of claim 13, wherein determining the placement of the annotation for the second images comprises:
identifying correspondences between the first image and the second images;
determining a planar transformation between a first region of the first image containing the feature and a second region of the second image containing the feature; and
applying the planar transformation to the annotation as depicted in the first image.

20. One or more non-transitory computer readable media having instructions stored thereon for performing a method, the method comprising:
processing a plurality of images of an object, the plurality of images comprising a first image having an annotation associated with a feature included in the first image, the plurality of images further comprising second images including the feature, the annotation associated with the feature being absent from the second images;
automatically determining, via estimation of a per-pixel dense correspondence between a source frame and a target frame using a spatial transformer network that is trained to transform images of an object in an arbitrary pose to a target pose, a placement of the annotation for the second images such that the annotation is configured to be automatically propagated to the second images to be associated with the first feature;
automatically propagating the annotation to the second images to cause the second images to include the annotation in accordance with the determined placement; and
storing, on a storage device, the annotated second images.

* * * * *